United States Patent
Ohkuma et al.

(10) Patent No.: US 7,396,075 B2
(45) Date of Patent: Jul. 8, 2008

(54) ELECTRICAL DEVICE COOLING STRUCTURE IN VEHICLE

(75) Inventors: Kanae Ohkuma, Wako (JP); Harumi Takedomi, Wako (JP); Eiji Koike, Wako (JP); Masao Kawata, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/476,906

(22) Filed: Jun. 29, 2006

(65) Prior Publication Data

US 2007/0040418 A1 Feb. 22, 2007

(30) Foreign Application Priority Data

Jul. 19, 2005 (JP) ............................. 2005-208041

(51) Int. Cl.
*A47C 7/74* (2006.01)
*B60N 2/32* (2006.01)
*B60N 2/36* (2006.01)

(52) U.S. Cl. .............................. 297/180.1; 297/180.13; 297/180.14; 297/15; 296/65.05

(58) Field of Classification Search .............. 297/180.1, 297/180.13, 180.14, 15; 296/65.05, 65.16
See application file for complete search history.

(56) References Cited

U.S. PATENT DOCUMENTS

| 5,918,930 | A | * | 7/1999 | Kawai et al. ............ 297/180.13 |
| 6,817,645 | B2 | * | 11/2004 | Taguchi et al. ........ 296/65.05 X |
| 2004/0041431 | A1 | | 3/2004 | Ito et al. |
| 2006/0214473 | A1 | * | 9/2006 | Ito et al. ................ 296/65.05 X |

FOREIGN PATENT DOCUMENTS

| JP | 2004-1683 A | 1/2004 |
| JP | 2004-98722 A | 4/2004 |
| WO | WO 2005/037583 A1 | 4/2005 |

* cited by examiner

*Primary Examiner*—Rodney B. White
(74) *Attorney, Agent, or Firm*—Westerman, Hattori, Daniels & Adrian, LLP.

(57) ABSTRACT

A rear seat is foldable by moving downward a seat cushion and folding forward a seat back. A power source unit is disposed below a rear floor to the rear of the rear seat. When the rear seat is in an unfolded state, cooling air can be introduced from inside a vehicle compartment, through a space between a lower surface of the seat cushion and an upper surface of an underseat floor, into a cooling-air introduction port in the power source unit. When the rear seat is in a folded state, the cooling air is introduced from inside the vehicle compartment, through cooling-air introduction passages, into the cooling-air introduction port. Thus, the power source unit can be cooled irrespective of whether the rear seat is in the folded state, without reducing the foldability of the rear seat.

12 Claims, 14 Drawing Sheets

IN STATE WHERE REAR SEAT IS FOLDED

IN STATE WHERE REAR SEAT IS USED

IN STATE WHERE REAR SEAT IS USED

IN STATE WHERE REAR SEAT IS FOLDED

ELECTRICAL DEVICE COOLING STRUCTURE IN VEHICLE

RELATED APPLICATION DATA

The Japanese priority application No. 2005-208041 upon which the present application is based is incorporated in its entirety herein by reference.

BACKGROUND OF THE INVENTION

1. Field of the Invention

The present invention relates to an electrical device cooling structure in a vehicle, in which an electrical device disposed under a rear floor to the rear of a foldable rear seat is cooled by cooling air introduced from inside a vehicle compartment.

2. Description of the Related Art

Japanese Patent Application Laid-open No. 2004-1683 discloses an electrical device cooling structure, in which a battery pack for driving a motor for driving an automobile is mounted in a luggage space to the rear of a rear seat, and an intake duct for supplying cooling air to the battery back opens sideways of a seat back of a rear seat.

Japanese Patent Application Laid-open No. 2004-98722 discloses a so-called diving-down foldable seat, in which a seat cushion is moved downward and a seat back is declined forward to cause an upper surface of the thus-folded seat back to be continuous substantially flatly to a rear floor in the rear of a seat.

However, Japanese Patent Application Laid-open No. 2004-1683 has a problem that because the intake duct for supplying the cooling air to the battery pack opens sideways of the seat back of the rear seat, the opening situates near an occupant's ear and generates nose. In order to avoid this problem, it is conceivable that the cooling air is supplied from below the rear seat to the battery pack. However, in a vehicle provided with the diving-down foldable seat described in Japanese Patent Application Laid-open No. 2004-98722, it is difficult to secure a cooling-air passage when the seat is folded.

SUMMARY OF THE INVENTION

Accordingly, it is an object of the present invention to effectively cool an electrical device mounted in the rear of a rear seat without reducing the foldability of the rear seat.

In order to achieve the above object, there is provided an electrical device cooling structure in a vehicle, including, a rear seat including a seat cushion and a seat back, the rear seat foldable by moving downward the seat cushion and folding forward the seat back so that an upper surface of the folded seat back becomes substantially flatly continuous to the rear floor which is located to the rear of the seat back; and a cooling-air introduction port provided in an electrical device which is disposed under a rear floor to drive a motor for driving the vehicle, cooling air being introduced into the cooling-air introduction port through a space between a lower surface of the seat cushion of the rear seat in an unfolded state and an upper surface of an underseat floor, wherein when the rear seat is in a folded state a cooling-air introduction passage is formed for introducing the cooling air in the vehicle compartment into the cooling-air introduction port in the electrical device.

With the arrangement of the first feature, a luggage chamber having a larger capacity can be formed in a rear portion of a vehicle body, because of the provision of the rear seat foldable by moving downward the seat cushion and folding forward the seat back so that the upper surface of the folded seat back becomes substantially flatly continuous to the rear floor which is located to the rear of the seat back. When the rear seat is in an unfolded state, the cooling air can be introduced from inside the vehicle compartment, through the space between the lower surface of the seat cushion and the upper surface of the underseat floor, into the cooling-air introduction port in the electrical device disposed below the rear floor to drive the motor for driving the vehicle. When the rear seat is in a folded state, the cooling air can be introduced from inside the vehicle compartment, through the cooling-air introduction passage, into the cooling-air introduction port. Therefore, the electrical device can be cooled irrespective of whether the rear seat is in the folded state or the unfolded state.

According to a second feature, in addition to the first feature, the cooling-air introduction passage is formed between the lower surface of the seat cushion of the rear seat in the folded state and the upper surface of the underseat floor.

With the arrangement of the second feature, the cooling-air introduction passage is formed between the lower surface of the seat cushion of the rear seat in the folded state and the upper surface of the underseat floor. Therefore, the cooling-air introduction passage is located in a position distant and lower from the occupant's ear, thereby reducing noise.

According to a third feature, in addition to the first or second feature, a fuel tank is disposed below a front seat located in front of the rear seat.

With the arrangement of the third feature, the fuel tank is disposed below the front seat located in front of the rear seat. Therefore, the cooling-air introduction passage for introducing the cooling air into the cooling-air introduction port is not blocked by the fuel tank, thereby improving the effect of cooling the electrical device.

According to a fourth feature, in addition to the first or second feature, a hollow cross member is disposed below the rear seat to interconnect left and right side frames, and the cooling-air introduction passage passes through the inside of the cross member.

With the arrangement of the fourth feature, the cooling-air introduction passage passes through the inside of the hollow cross member interconnecting the left and right side frames below the rear seat. Therefore, it is possible to secure a sufficient sectional area of the cooling-air introduction passage, thereby improving the effect of cooling the electrical device.

According to a fifth feature, in addition to the first or second feature, a bridge plate is pivotally supported at a front end of the rear floor so that the bridge plate covers a gap between the folded seat back and the rear floor.

With the arrangement of the fifth feature, the gap between the folded seat back and the rear floor is covered by the bridge plate which is pivotally supported at the front end of the rear floor. Therefore, it is possible to eliminate a gap between the seat back and the rear floor, thereby improving the appearance and preventing the dropping-in of articles.

According to a sixth feature, in addition to the first or second feature, the electrical device is at least one of a battery and a motor control device.

With the arrangement of the sixth feature, it is possible to reliably cool the battery or the motor control device which is the electrical device heated due to the driving of the motor.

A power source unit 19 in the above embodiments corresponds to the electrical device of the present invention, and a battery module 35 in the embodiments corresponds to the battery of the present invention.

The above and other objects, features and advantages of the invention will become apparent from the following description of preferred embodiments taken in conjunction with the accompanying drawings.

BRIEF DESCRIPTION OF THE DRAWINGS

FIGS. 1 to 12 show a first embodiment of the present invention in which:

FIG. 1 is a side view of the entire hybrid vehicle;

FIG. 2 is an enlarged view of essential portions of FIG. 1;

FIG. 3 is a view taken in a direction indicated by arrow 3 in FIG. 2 (a use state of a rear seat);

FIG. 4 is a view taken in a direction indicated by arrow 3 in FIG. 2 (a diving-down state of the rear seat);

FIG. 5 is a sectional view taken along a line 5-5 in FIG. 3;

FIG. 6 is a sectional view taken along a line 6-6 in FIG. 3;

FIG. 7 is a sectional view taken along a line 7-7 in FIG. 4;

FIG. 8 is a sectional view taken along a line 8-8 in FIG. 4;

FIG. 9 is a sectional view taken along a line 9-9 in FIG. 3;

FIG. 10 is a sectional view taken along a line 10-10 in FIG. 3;

FIG. 11 is a sectional view taken along a line 11-11 in FIG. 4; and

FIG. 12 is an exploded perspective view of a power source unit.

FIGS. 13 and 14 show a second embodiment of the present invention in which:

FIG. 13 is a view corresponding to FIG. 3, but according to a second embodiment of the present invention; and FIG. 14 is a sectional view taken along a line 14-14 in FIG. 13.

DETAILED DESCRIPTION OF PREFERRED EMBODIMENT

Figure 1:
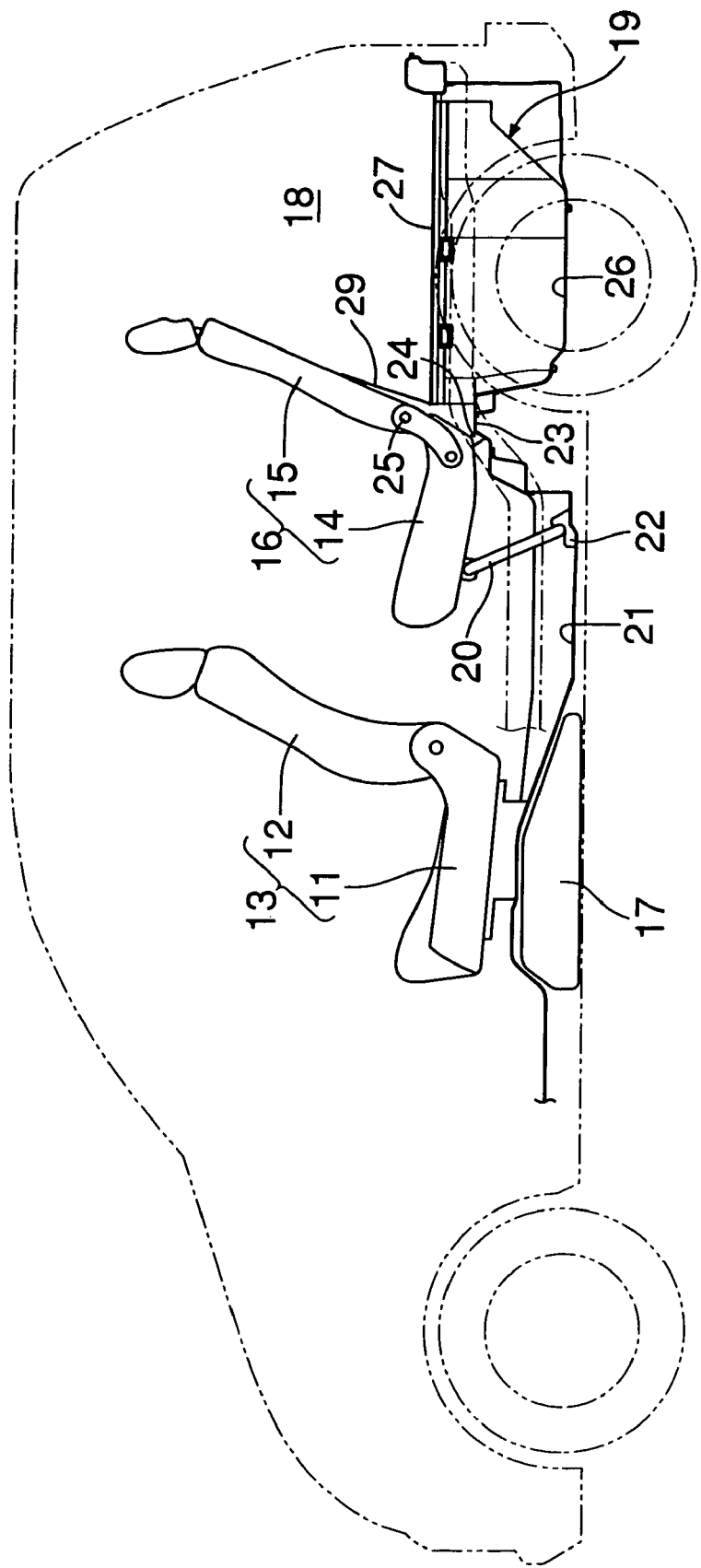
Figure 2:
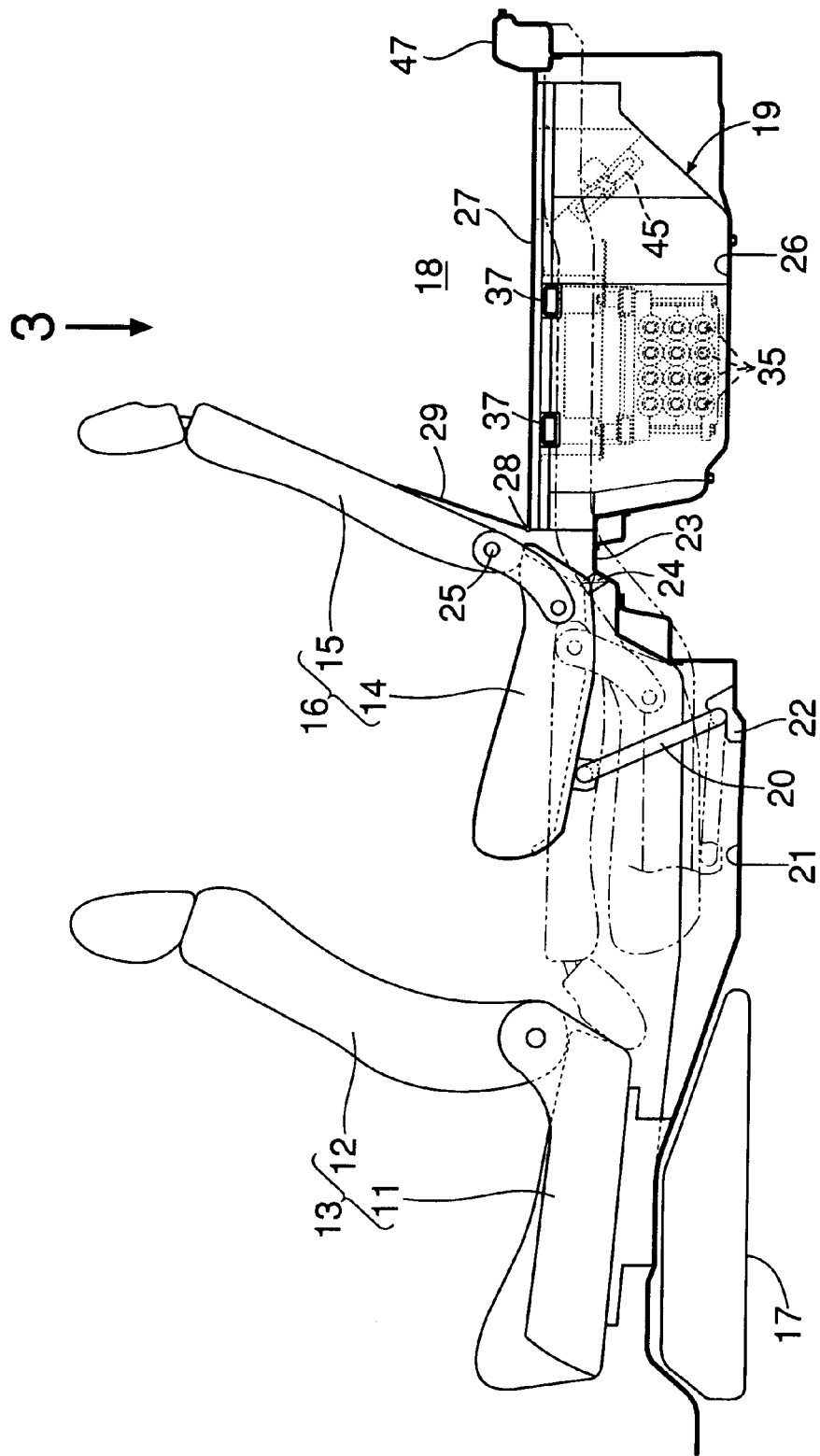
Figure 3:
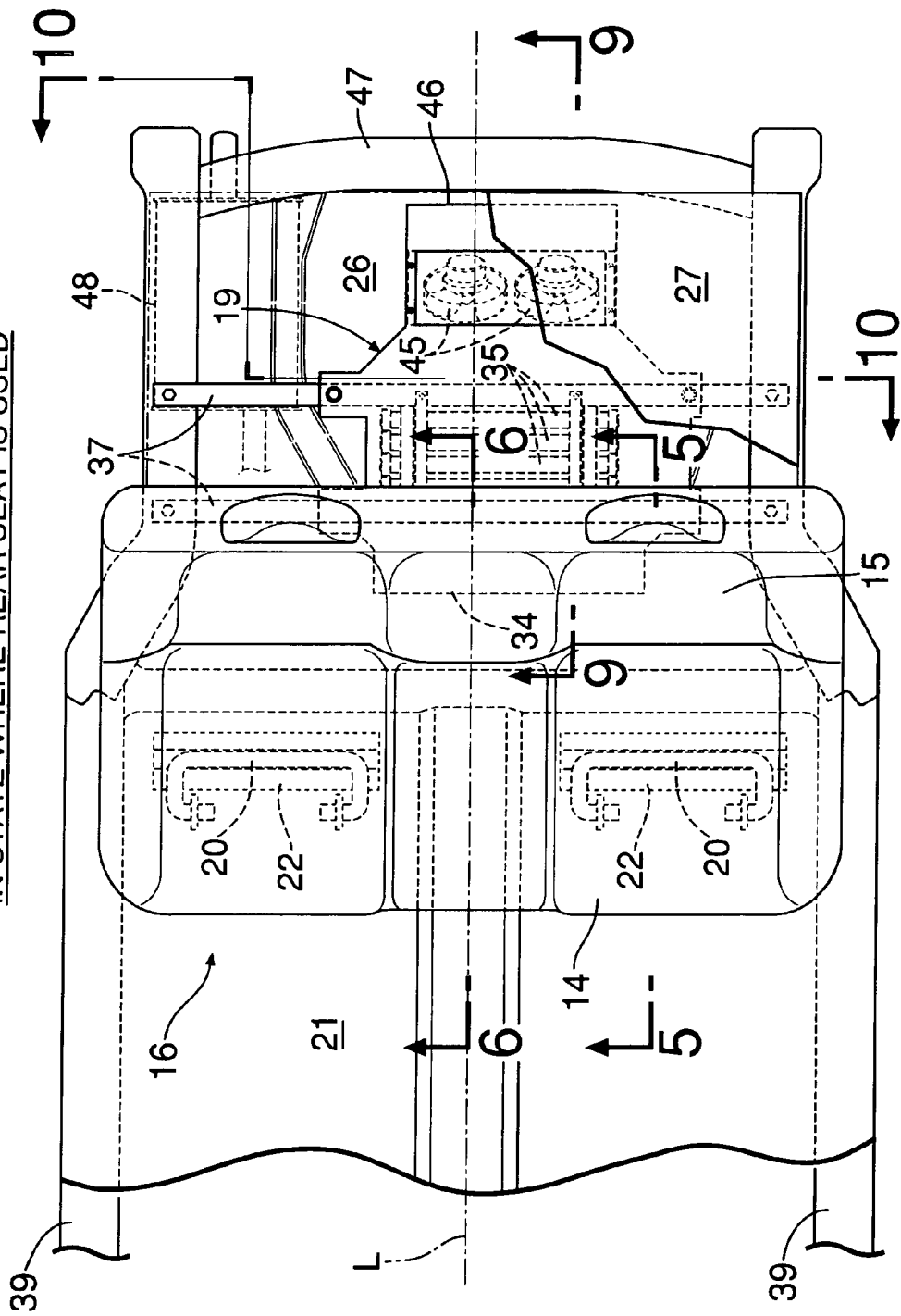
Figure 4:
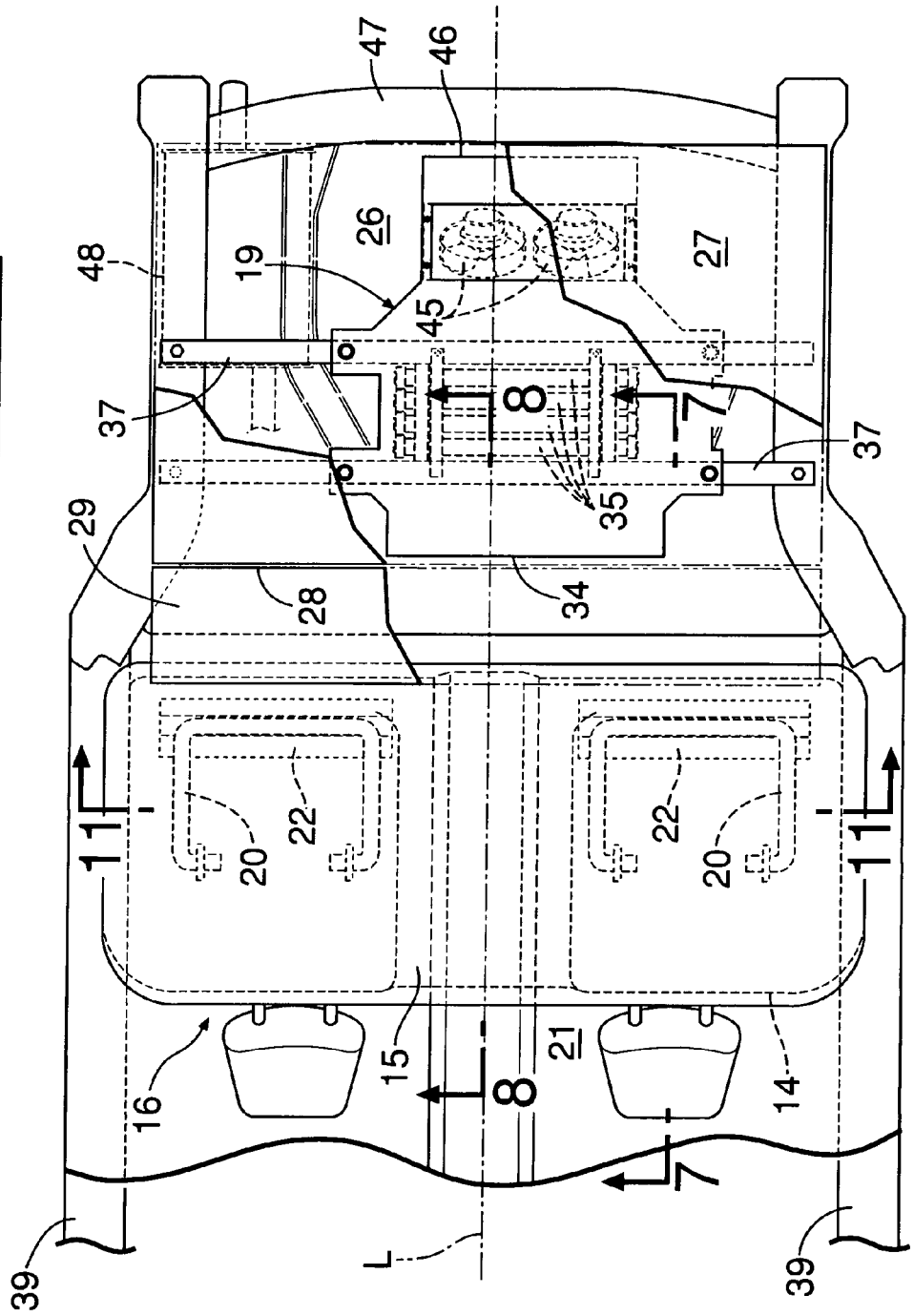

As shown in FIGS. 1 to 3, a vehicle including an engine (not shown) and a motor (not shown) as driving sources includes, a front seat 13 including a seat cushion 11 and a seat back 12; and a rear seat 16 including a seat cushion 14 and a seat back 15. A fuel tank 17 is disposed below the seat cushion 11 of the front seat 13. A power source unit 19 for driving the motor is mounted below a luggage space 18 to the rear of the rear seat 16.

A pair of left and right stays 20, 20 are foldably mounted on a lower surface of the seat cushion 14 of the rear seat 16. In a state where the rear seat 16 is used, lower ends of the stays 20, 20 are engaged with hooks 22, 22 provided on an underseat floor 21 under the rear seat 16, and a rear end of the seat cushion 14 is engaged with a seat-cushion locking portion 24 provided on a bulging portion 23 in the rear of the underseat floor 21. The seat back 15 is capable of being folded down forward through a reclining shaft 25 mounted at the rear end of the seat cushion 14.

Therefore, when the rear end of the seat cushion 14 is disengaged from the seat-cushion locking portion 24 on the bulging portion 23, the stays 20, 20 are swung forward about the hooks 22, 22, whereby the seat cushion 14 is shifted downward to a position closely along the underseat floor 21 while being moved in parallel forward and downward. Then, the rear seat 16 is folded by swinging the seat back 15 forward about the reclining shaft 25, so that the seat back 15 becomes substantially horizontal (see a dashed line in FIG. 2).

A power-source-unit accommodating section 26 recessed downward is continuously formed rearward from the bulging portion 23 provided in the rear of the underseat floor 21. An opening in an upper surface of the power-source-unit accommodating section 26 is covered by a rear floor 27 constituting a floor of the luggage space 18. The height of the rear floor 27 is substantially the same as that of an upper surface of the seat cushion 14 of the rear seat 16 in a use state, and is also substantially the same as that of an upper surface of the seat back 15 of the rear seat 16 in a folded state. A bridge plate 29 is pivotally supported at a front end of the rear floor 27 through a hinge 28. In a state where the seat back 15 of the rear seat 16 is folded forward, the bridge plate 29 is swung forward to be placed on the upper surface of the seat back 15 (see FIG. 7), thereby covering a gap between the rear floor 27 and the seat back 25 to prevent the dropping-in of articles.

Figure 12:
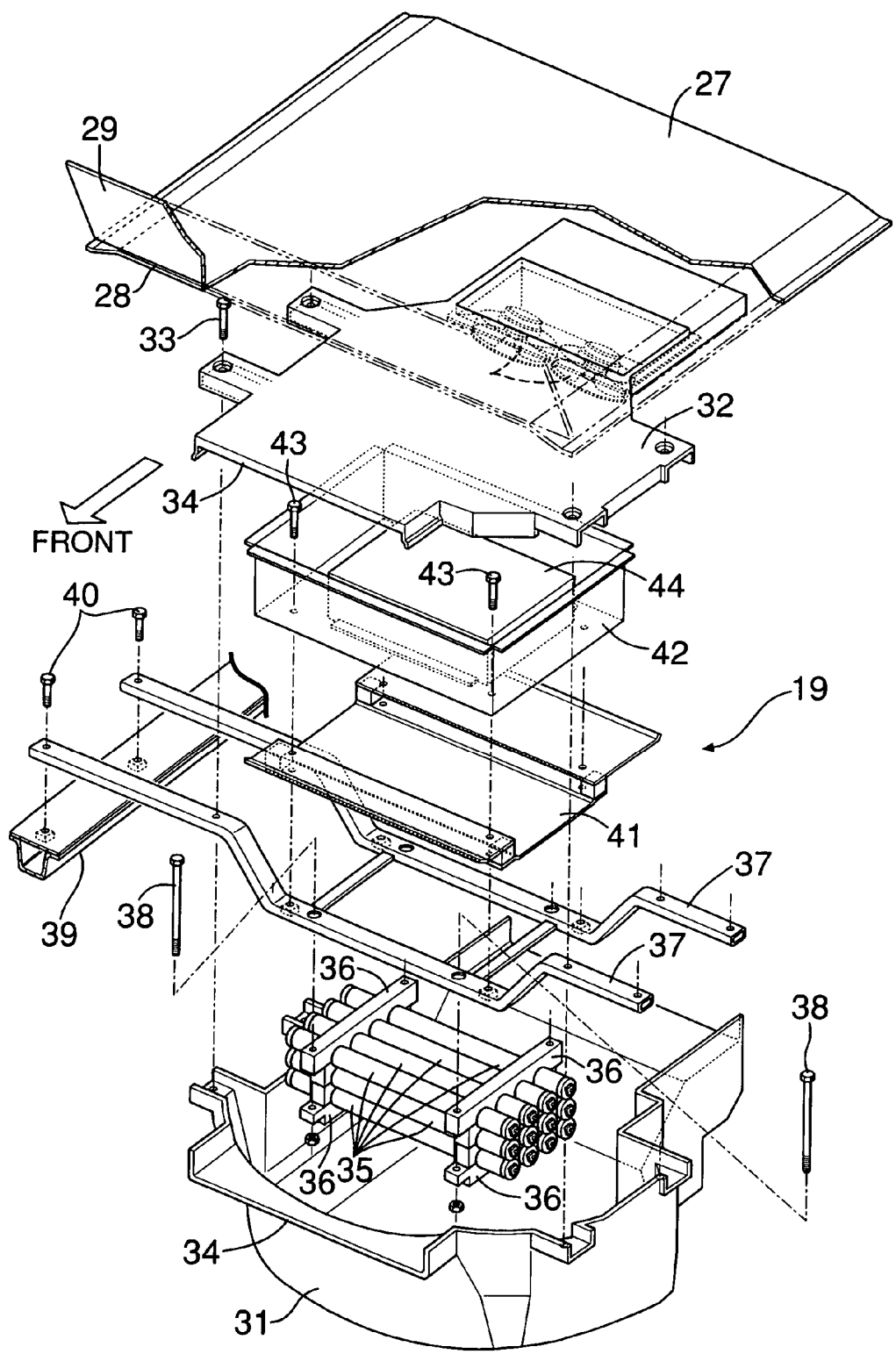

The structure of the power source unit 19 will be described below with reference to FIGS. 9 and 12.

The power source unit 19 comprises a vessel-shaped lower case 31 and a lid-shaped upper case 32 which are coupled to each other by bolts 33. In this state, a laterally longer oblong cooling-air introduction port 34 opens forward between the lower case 31 and the upper case 32. A plurality of cylindrical battery modules 35 are bundled by a pair of holders 36, 36. A pair of front and rear battery support frames 37, 37 are fixed to upper surfaces of the holders 36, 36 by bolts 38. The battery support frames 37, 37 penetrate through upper portions of the lower case 31 to project in left and right directions, and are fixed at their end to left and right side frames 39, 39 by bolts 40. By connecting the opposite ends of the battery support frames 37, 37 to the left and right side frames 39, 39 in this manner, the battery support frames 37, 37 can function as cross members, thereby enhancing the rigidity of a vehicle body.

A heat transfer plate 41 and a control-unit accommodating box 42 are fastened together to upper surfaces of the battery support frames 37, 37 by bolts 43. A motor control device 44 such as PDU (a power drive unit) and D/B (a down-converter) is accommodated in the control-unit accommodating box 42. Two fans 45, 45 are disposed in the rear of the lower case 31 and the upper case 32. A cooling-air discharge port 46 is formed in the rear of the fans 45, 45. The cooling-air discharge port 46 faces an opening 47a in a cross member 47 which interconnects rear ends of the left and right side frames 39, 39, so that a portion of cooling air exiting the cooling-air discharge port 46 flows through the inside of the cross member 47, and is partially discharged to the outside of the vehicle and partially returned to the inside of the vehicle.

A muffler 48 is disposed on a right side of a lower surface of a rear portion of the vehicle body. Thus, in order to avoid the interference with the muffler 48, the power source unit 19 is slightly offset to the left side of the vehicle body with respect to a centerline L of the vehicle body, and correspondingly, the cooling-air introduction port 34 is also slightly offset to the left side of the vehicle body with respect to the centerline L of the vehicle body.

The operation of the first embodiment having the above-described arrangement will be described below.

Figure 5:
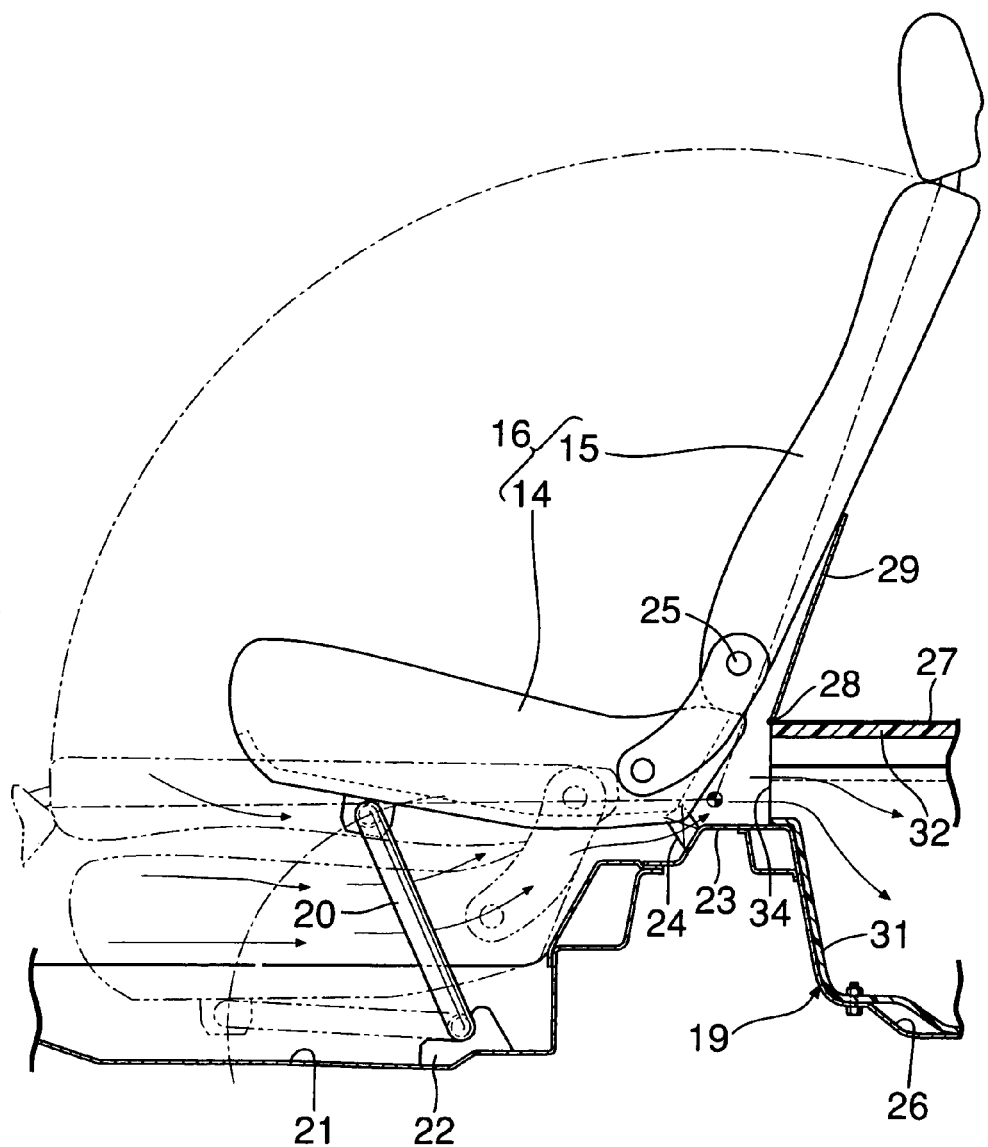
Figure 6:
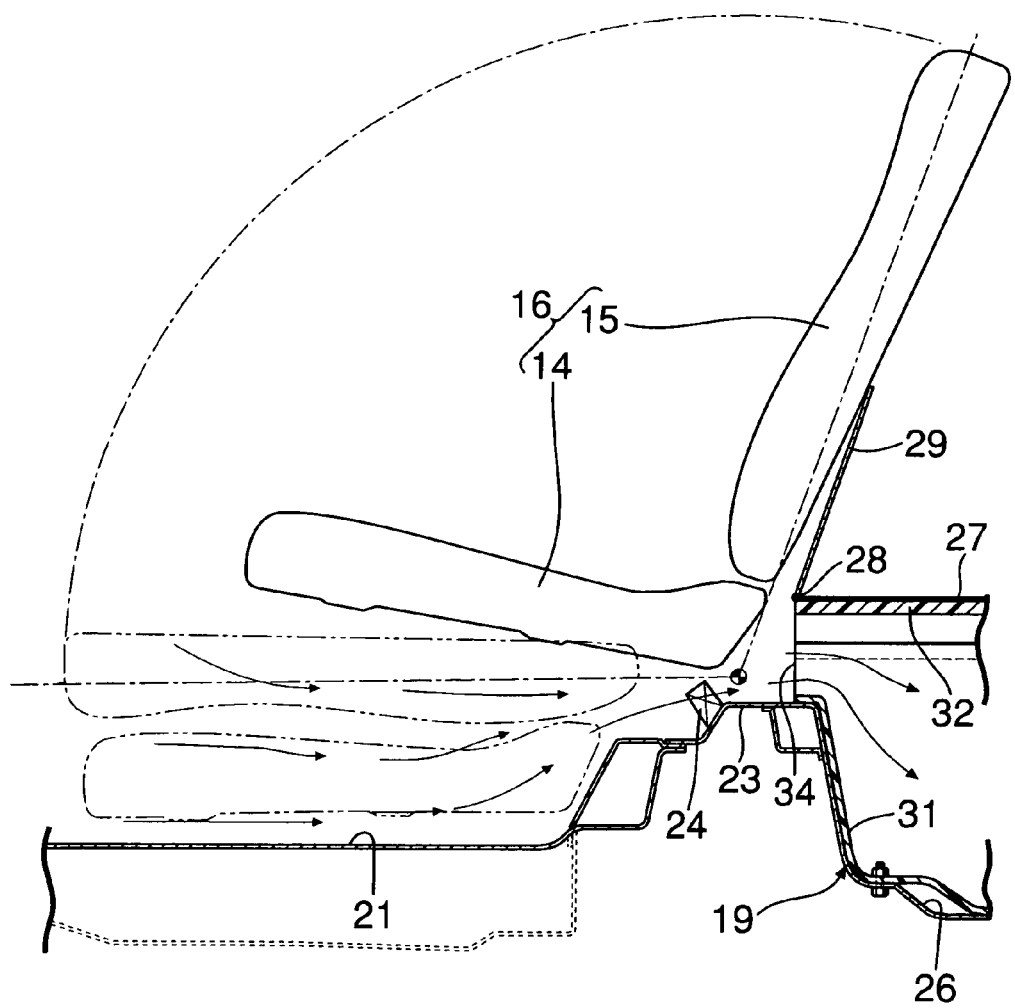
Figure 9:
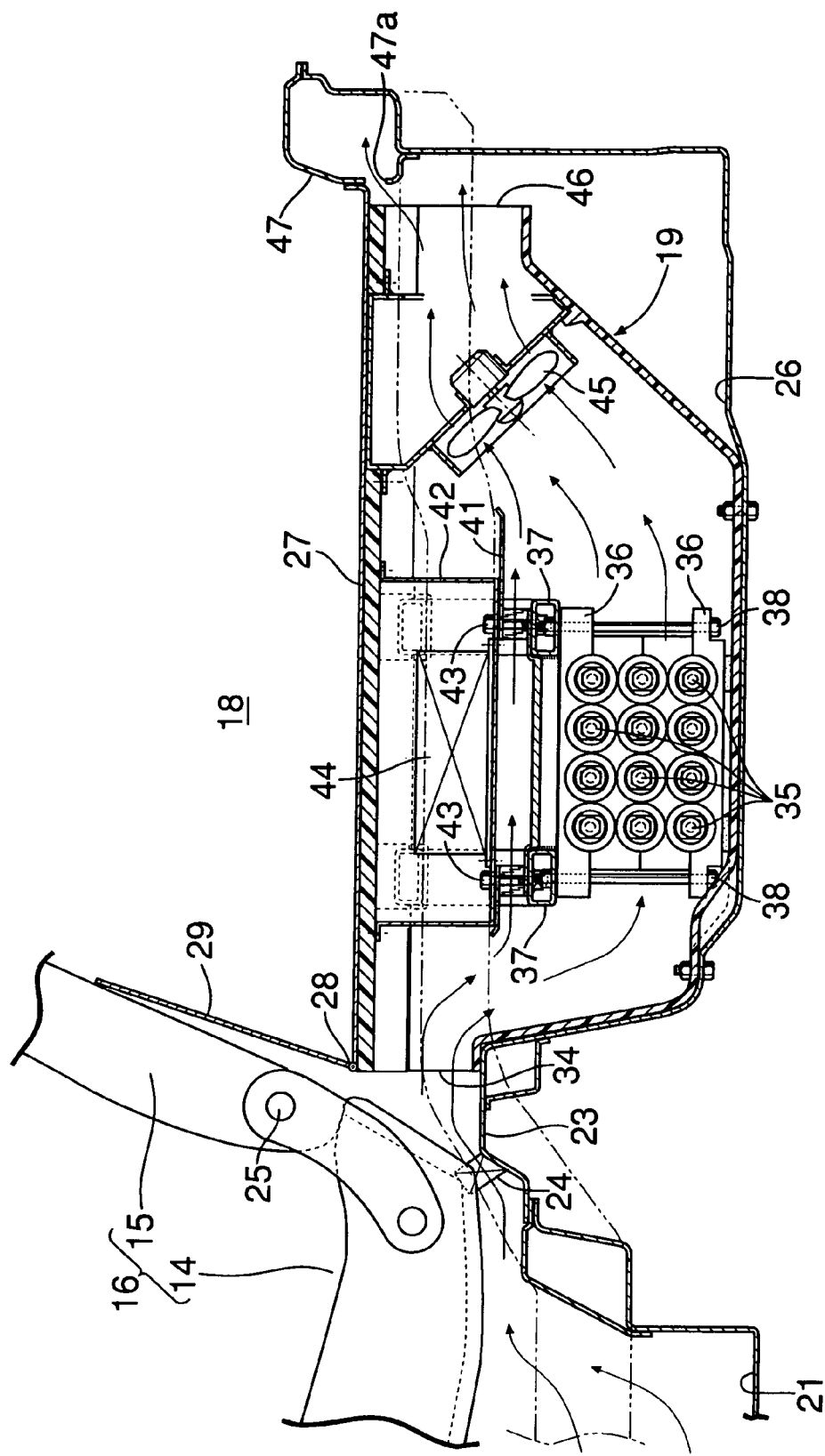
Figure 10:
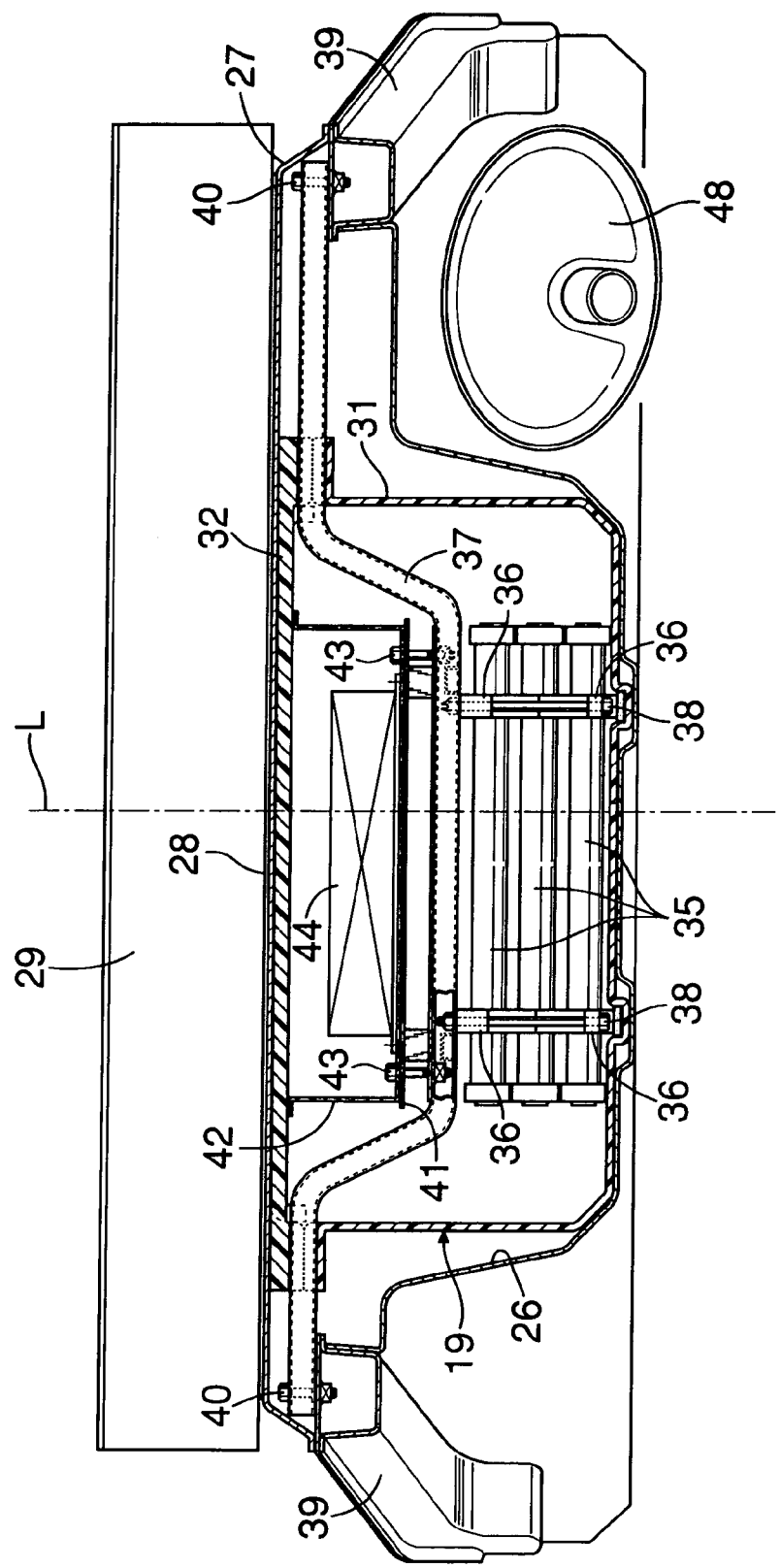
Figure 11:
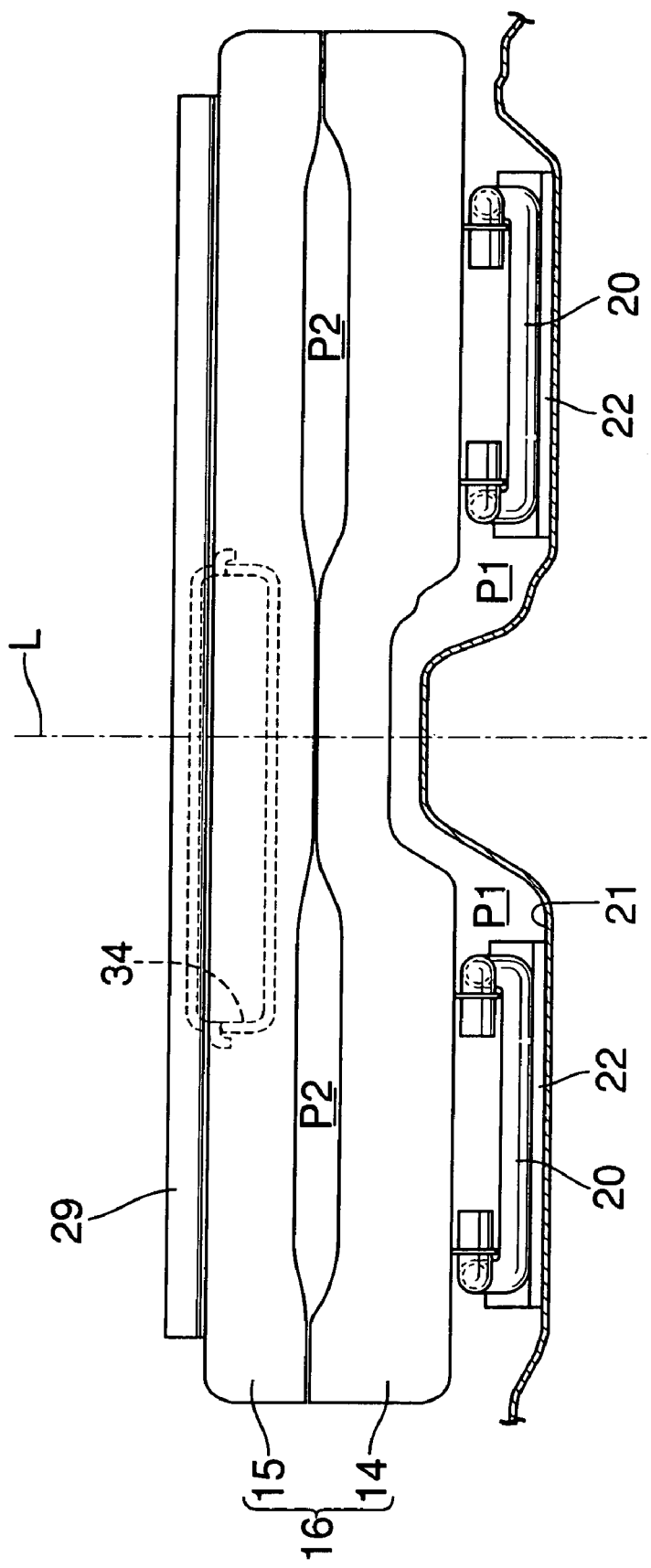

As shown in FIGS. 5, 6 and 9, when the rear seat 16 is in a use state, the cooling-air introduction port 34 between the lower case 31 and the upper case 32 of the power source unit 19 opens toward the rear end of the seat cushion 14. When the fans 45, 45 within the power source unit 19 are driven, conditioned cooling air existing in a space in front of the rear seat 16 is drawn rearward through a gap between the lower surface of the cooling-air introduction port 34 and the upper surface of the underseat floor 21, and flows through the cooling-air introduction port 34 into the lower case 31 and the upper case 32 of the power source unit 19. A portion of the cooling air cools the bundled battery modules 35 while flowing through gaps between the battery modules 35.

Heat generated by the motor control device 44 accommodated in the control-unit accommodating box 42 is transmitted through a bottom wall of the control-unit accommodating box 42 to the heat transfer plate 41, and dissipated to the cooling air flowing along the lower surface of the heat transfer plate 41. The cooling air, which has cooled the battery modules 35 and the motor control device 44 in this manner, is passed through the fans 45, 45 and discharged from the cooling-air discharge port 46.

When the rear seat 16 is in a use (or unfolded) state, a sufficient space is present between the lower surface of the seat cushion 14 and the upper surface of the underseat floor 21, either at the opposite ends of the rear seat 16 shown in FIG. 5 or at the central portion of the rear seat 16 shown in FIG. 6. Thus, the cooling air within a vehicle compartment is supplied to the cooling-air introduction port 34 without hindrance.

Figure 7:
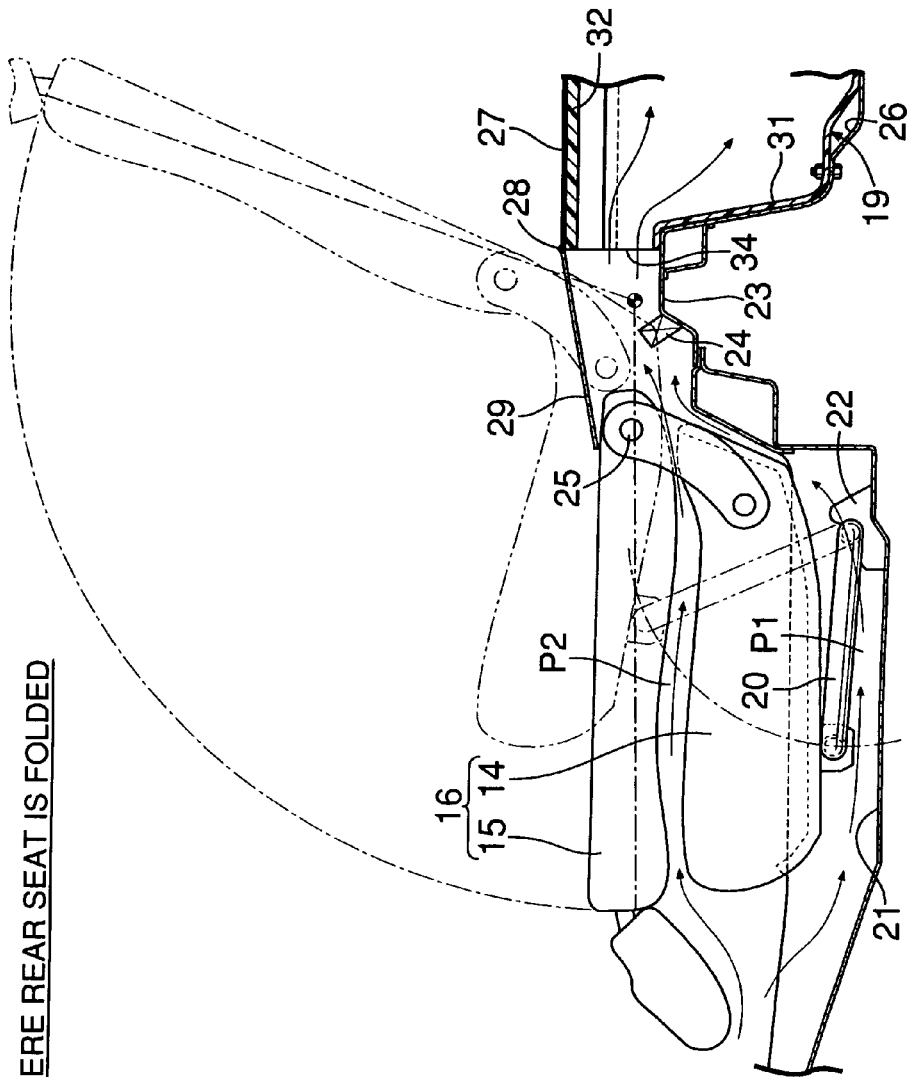
Figure 8:
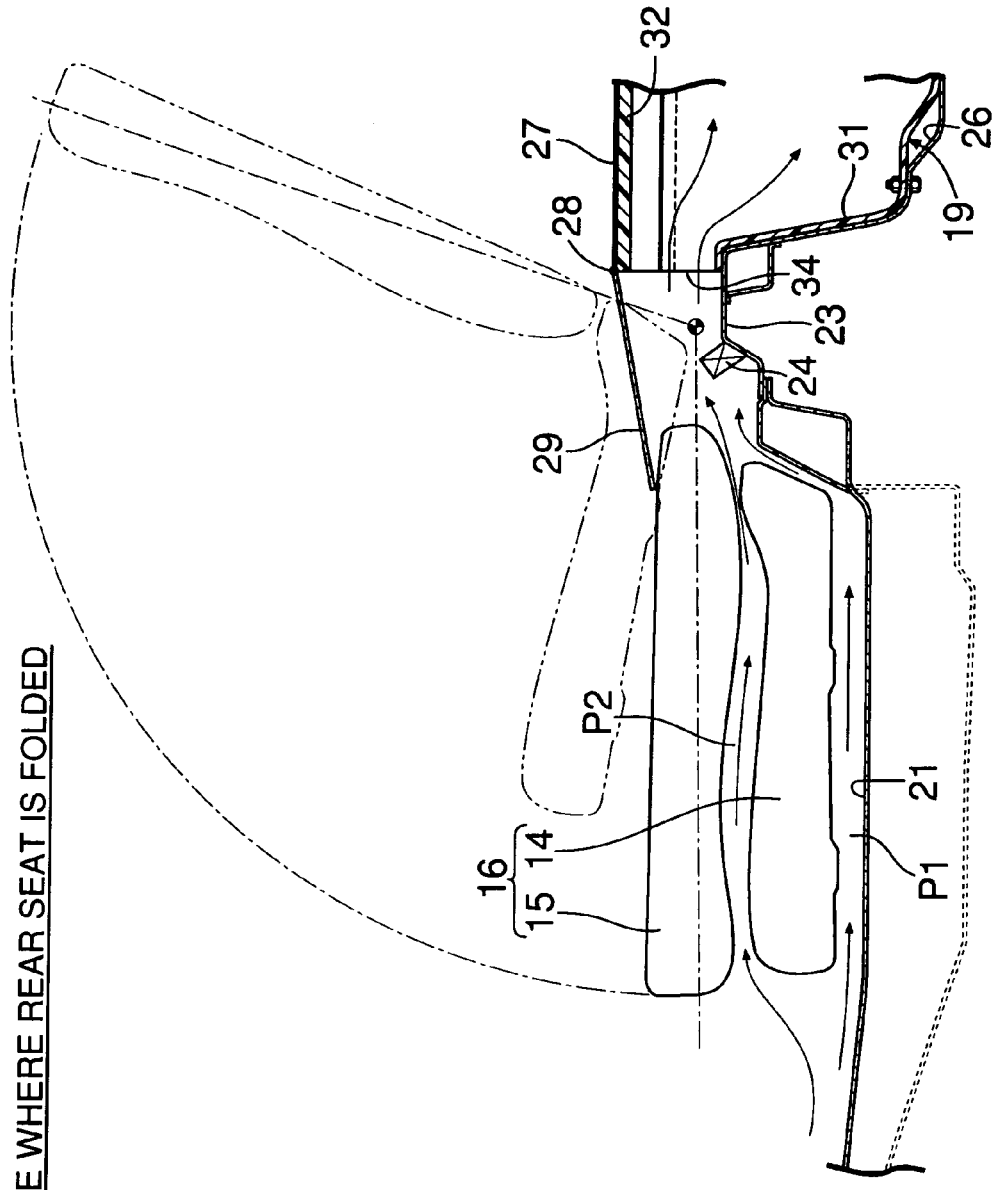

As shown in FIGS. 7 and 8, when the rear seat 16 is in a folded state, the seat cushion 14 and the seat back 15 of the rear seat 16 are superposed on the upper surface of the underseat floor 21. However, either at the opposite ends of the rear seat 16 shown in FIG. 7 or at the central portion of the rear seat 16 shown in FIG. 8, a first cooling-air introduction passage P1 is formed between the underseat floor 21 and the seat cushion 14, and a second cooling-air introduction passage P2 is formed between the seat cushion 14 and the seat back 15. Therefore, the cooling air within the vehicle compartment can be supplied to the cooling-air introduction port 34 without hindrance to cool the battery modules 35 and the motor control device 44.

Because the rear seat 16 foldable in a so-called diving-down manner is provided as described above, the cooling air within the vehicle compartment can be introduced into the cooling-air introduction port 34 by securing the first and second cooling-air introduction passages P1 and P2 along the folded rear seat 16, while forming a luggage chamber of a large capacity by connecting generally flatly the upper surface of the folded seat back 15 and the rear floor 27. Moreover, when an occupant is sitting on the rear seat 16, the cooling air flows along the underseat floor 21 which is distant from the occupant's ears, thereby reducing noise heard by the occupant.

Figure 13:
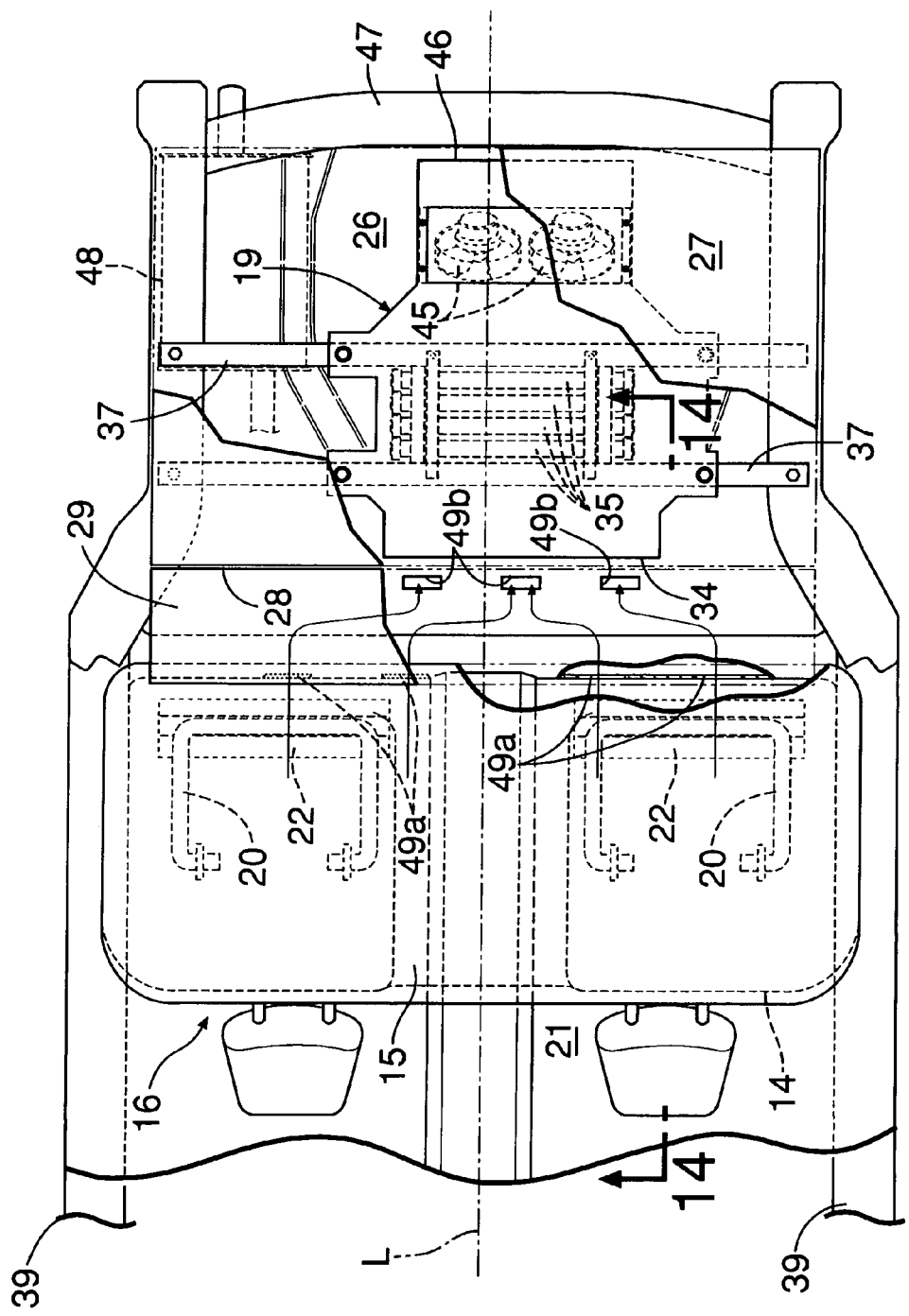
Figure 14:
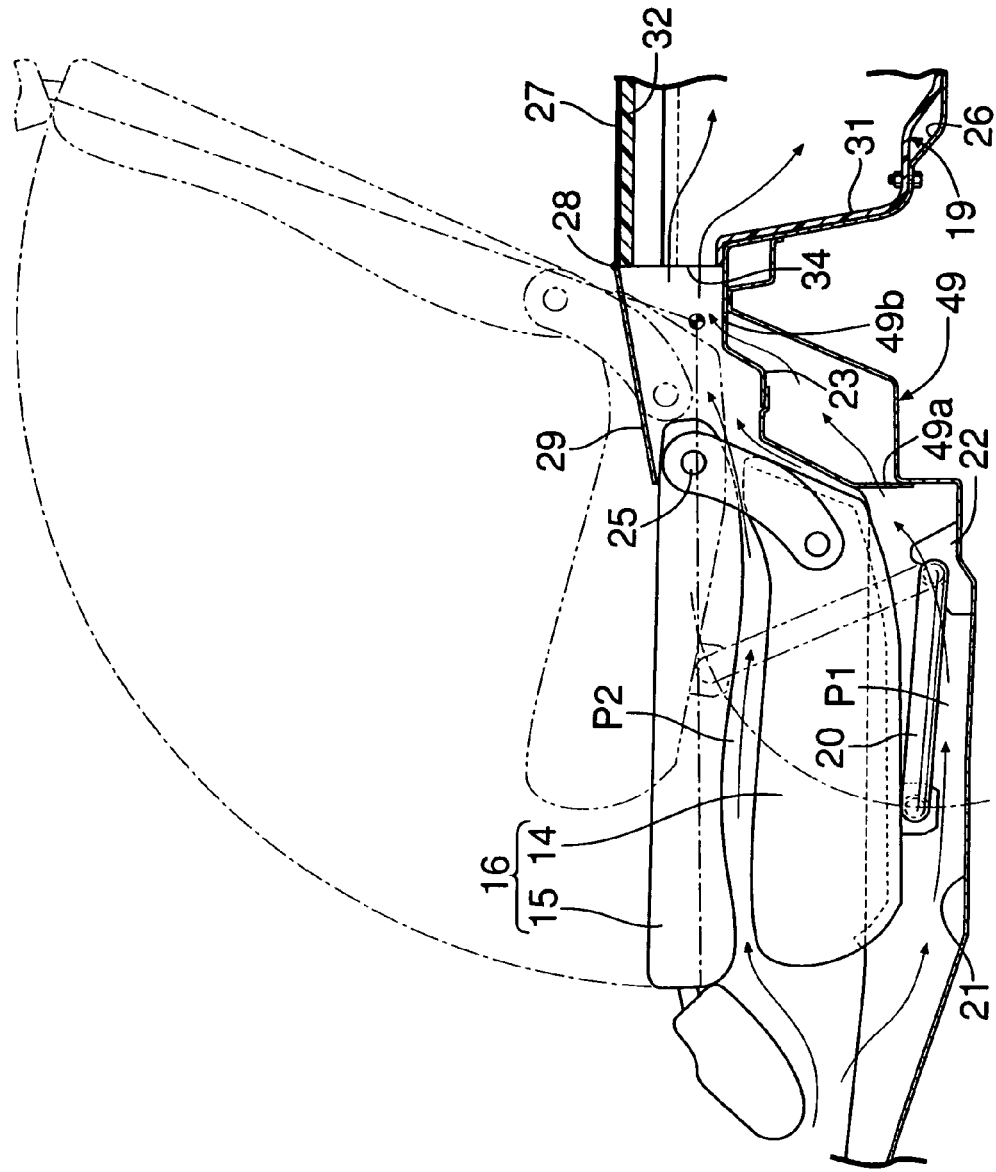

A second embodiment of the present invention will now be described with reference to FIGS. 13 and 14.

A cross member 49 interconnecting left and right side frames 39, 39 is laterally disposed in the rear of a seat cushion 14 of a rear seat 16 in a folded state. The cross member 49 is formed to have a box-shaped section including a portion of a bulging portion 23 of a floor, and openings 49a and 49b are formed in front and upper surfaces of the cross member 49. When the rear seat 16 is folded, a first cooling-air introduction passage P1 is narrowed in the rear of the seat cushion 14, but cooling air is passed through the cross member 49 at such a narrowed portion, that is, the inside of the cross member 49 is used as the first cooling-air introduction passage P1, thereby enabling a smooth flowing of the cooling air to enhance the cooling effect.

Although the embodiments of the present invention have been described, various modifications in design may be made without departing from the subject matter of the invention.

For example, although the vehicle including the front seat 13 and the rear seat 16 has been illustrated in the embodiments, the present invention is also applicable to a vehicle including a middle seat between the front seat 13 and the rear seat 16.

We claim:

1. An electrical device cooling structure in a vehicle, comprising:
    a rear seat including a seat cushion and a seat back, the rear seat being foldable by moving downward the seat cushion and folding forward the seat back so that an upper surface of the folded seat back becomes substantially flatly continuous to a rear floor which is located to the rear of the seat back; and
    a cooling-air introduction port provided in an electrical device which is disposed under the rear floor, the electrical device driving a motor for driving the vehicle, an intake air space formed between a lower surface of the seat cushion of the rear seat, in an unfolded state, and an upper surface of the underseat floor, wherein the intake air space is in communication with a cooling-air introduction port of the electrical device, and
    wherein, when the rear seat is in a folded state, a folded air intake space is formed at least between the lower surface of the seat cushion of the rear seat and the underseat floor and/or between the seat cushion of the rear seat and the seat back, the folded air intake space also being in communication with the cooling-air introduction port.

2. An electrical device cooling structure in a vehicle according to claim 1, wherein the folded air intake space is formed between the lower surface of the seat cushion of the rear seat in the folded state and the upper surface of the underseat floor.

3. An electrical device cooling structure in a vehicle according to claim 2, wherein a fuel tank is disposed below a front seat located in front of the rear seat.

4. An electrical device cooling structure in a vehicle according to claim 2, further comprising a hollow cross member disposed below the rear seat to interconnect left and right side frames, and wherein the folded air intake space passes through the inside of the cross member.

5. An electrical device cooling structure in a vehicle according to claim 2, wherein a bridge plate is pivotally supported at a front end of the rear floor so that the bridge plate covers a gap formed between the folded seat back and the rear floor.

6. An electrical device cooling structure in a vehicle according to claim 2, wherein the electrical device is at least one of a battery and a motor control device.

7. An electrical device cooling structure in a vehicle according to claim 2, further comprising a fan for drawing cooling air into the cooling-air introduction port.

8. An electrical device cooling structure in a vehicle according to claim 1, wherein a fuel tank is disposed below a front seat located in front of the rear seat.

9. An electrical device cooling structure in a vehicle according to claim 1, further comprising a hollow cross member disposed below the rear seat to interconnect left and right side frames, and wherein the folded air intake space passes through the inside of the cross member.

10. An electrical device cooling structure in a vehicle according to claim 1, wherein a bridge plate is pivotally supported at a front end of the rear floor so that the bridge plate covers a gap formed between the folded seat back and the rear floor.

11. An electrical device cooling structure in a vehicle according to claim 1, wherein the electrical device is at least one of a battery and a motor control device.

12. An electrical device cooling structure in a vehicle according to claim 1, further comprising a fan for drawing cooling air into the cooling-air introduction port.

\* \* \* \* \*